(12) United States Patent
Kambatla

(10) Patent No.: US 11,099,892 B2
(45) Date of Patent: *Aug. 24, 2021

(54) UTILIZATION-AWARE RESOURCE SCHEDULING IN A DISTRIBUTED COMPUTING CLUSTER

(71) Applicant: Cloudera, Inc., Palo Alto, CA (US)

(72) Inventor: Karthik Kambatla, Mountain View, CA (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,996

(22) Filed: Feb. 21, 2020

(65) Prior Publication Data
US 2020/0192703 A1   Jun. 18, 2020

Related U.S. Application Data

(63) Continuation of application No. 15/595,713, filed on May 15, 2017, now Pat. No. 10,572,306.

(60) Provisional application No. 62/394,660, filed on Sep. 14, 2016.

(51) Int. Cl.
*G06F 9/44* (2018.01)
*G06F 9/48* (2006.01)
*G06F 9/50* (2006.01)

(52) U.S. Cl.
CPC .............. *G06F 9/4881* (2013.01); *G06F 9/50* (2013.01); *G06F 9/505* (2013.01); *G06F 9/5038* (2013.01); *G06F 9/5083* (2013.01); *G06F 2209/483* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 2006/0140115 A1* | 6/2006 | Timus | H04W 28/18 370/230 |
| 2008/0082979 A1 | 4/2008 | Coppinger et al. | |
| 2011/0055838 A1 | 3/2011 | Moyes | |
| 2012/0254822 A1 | 10/2012 | Lin et al. | |
| 2014/0245298 A1 | 8/2014 | Zhou et al. | |

(Continued)

OTHER PUBLICATIONS

International Search Report and Written Opinion of International Application No. PCT/US2017/043137; dated Oct. 26, 2017; 17 pages.

(Continued)

*Primary Examiner* — Wei Y Zhen
*Assistant Examiner* — Lanny N Ung
(74) *Attorney, Agent, or Firm* — Perkins Coie LLP

(57) ABSTRACT

Embodiments are disclosed for a utilization-aware approach to cluster scheduling, to address this resource fragmentation and to improve cluster utilization and job throughput. In some embodiments a resource manager at a master node considers actual usage of running tasks and schedules opportunistic work on underutilized worker nodes. The resource manager monitors resource usage on these nodes and preempts opportunistic containers in the event this over-subscription becomes untenable. In doing so, the resource manager effectively utilizes wasted resources, while minimizing adverse effects on regularly scheduled tasks.

19 Claims, 9 Drawing Sheets

(56) References Cited

U.S. PATENT DOCUMENTS

2015/0026336 A1*  1/2015  Suchter .............. H04L 43/0876
                                                              709/224
2017/0017521 A1*  1/2017  Gupta ................... G06F 9/4881

OTHER PUBLICATIONS

Extended European Search Report, EP Patent Application No. 17851228.1 based on PCT/US2017/043137, dated Apr. 30, 2020, 11 pages.

Yao Yi et al.: "Opera: Opportunistic and Efficient Resource Allocation in Hadoop Yarn by Harnessing Idle Resources", 2016 25th International Conference on Computer Communication and Networks (ICCCN), IEEE, Aug. 1, 2016, pp. 1-9.

Wei Zhang et al.: "Minimizing Interference and Maximizing Progress for Hadoop Virtual Machines", ACM Sigmetrics Performance Evaluation Review, Association for Computing Machinery, New York, NY, US, vol. 42, No. 4, Jun. 2, 2015, pp. 62-71.

Karanasos et al.: "Mercury: Hybrid Centralized and Distributed Scheduling in Large Shared Clusters", Microsoft Corporation, Usenix, the Advanced Computing Systems Association, Annual Technical Conference, Jun. 27, 2015, pp. 492-504.

* cited by examiner

UTILIZATION-AWARE RESOURCE SCHEDULING IN A DISTRIBUTED COMPUTING CLUSTER

CROSS-REFERENCE TO RELATED APPLICATION(S)

This application is a continuation of U.S. patent application Ser. No. 15/595,713, entitled "UTILIZATION-AWARE RESOURCE SCHEDULING IN A DISTRIBUTED COMPUTING CLUSTER" filed May 15, 2017, and is entitled to the benefit of and/or the right of priority to U.S. Provisional Application No. 62/394,660, entitled "UTILIZATION-AWARE RESOURCE SCHEDULING", filed Sep. 14, 2016, both of which applications are hereby incorporated by reference in their entireties. This application is therefore entitled to an effective filing date of Sep. 14, 2016.

TECHNICAL FIELD

The present disclosure generally relates to distributed computing clusters, and more particularly to the allocation and management of computing resources in distributed computing clusters.

BACKGROUND

Collecting and analyzing increasingly large amounts of data is integral to the efficient operation of modern-day enterprises. Data-centric programming models like Apache Hadoop MapReduce or Apache Spark are commonly used for such data analyses tasks. Apache Hadoop project (hereinafter "Hadoop") is an open-source software framework for developing software for reliable, scalable and distributed processing of large data sets across clusters of commodity machines. Hadoop includes a distributed file system, known as Hadoop Distributed File System (HDFS). HDFS links together the file systems on local nodes to form a unified file system that spans an entire Hadoop cluster. Hadoop can also be supplemented by other Apache projects including Apache Hive (hereinafter "Hive") and Apache HBase (hereinafter "HBase"). Hive is a data warehouse infrastructure that provides data summarization and ad hoc querying. HBase is a scalable, distributed NoSQL (No Structured Query Language) database or data store that supports structured data storage for large tables.

MapReduce and Spark jobs typically include multiple tasks, each processing a partition of the overall input for the job. A cluster scheduler, like Apache Hadoop YARN or Apache Mesos allows sharing of cluster computing resources among several jobs, potentially from multiple users. Existing cluster schedulers (e.g. YARN) support a scheduling model based on resource requests. In other words, jobs submitted by users can include a request for certain resources (e.g. CPU, memory, etc.) needed to process the job. In turn, a cluster scheduler can allocate resources at nodes in a computer cluster when they become available. Such resource allocations are generally referred to as containers. The computing resources allocated within a given container are reserved exclusively for use within the given container and cannot be used by other containers, even if the allocated resources are not currently being utilized.

The amount of computing resources required to process a given task can be difficult to predict. It is inevitably difficult to accurately estimate the resource requirements of a job or its constituent tasks because: (i) resource usage of a task varies over time, and (ii) resource usage can vary across tasks of the same job based on the input they process. Users are expected to estimate and request the peak usage across all tasks to ensure job completion. This problem is further exacerbated by the fact that end-users can use convenience wrapper libraries like Apache Hive to create a majority of these jobs, and are consequently unaware of their characteristics. For these reasons, in practice, users end up using defaults, picking very conservative estimates of peak utilization (e.g. based on historical usage), or copying resource requirements from other work-flows that are known to work. The over-allocation of resources to process jobs and tasks leads to resource fragmentation and severe under-utilization of the computing resources in the cluster.

BRIEF DESCRIPTION OF THE DRAWINGS

The present embodiments are illustrated by way of example and are not intended to be limited by the figures of the accompanying drawings. In the drawings.

DETAILED DESCRIPTION

Overview

Figure 1:
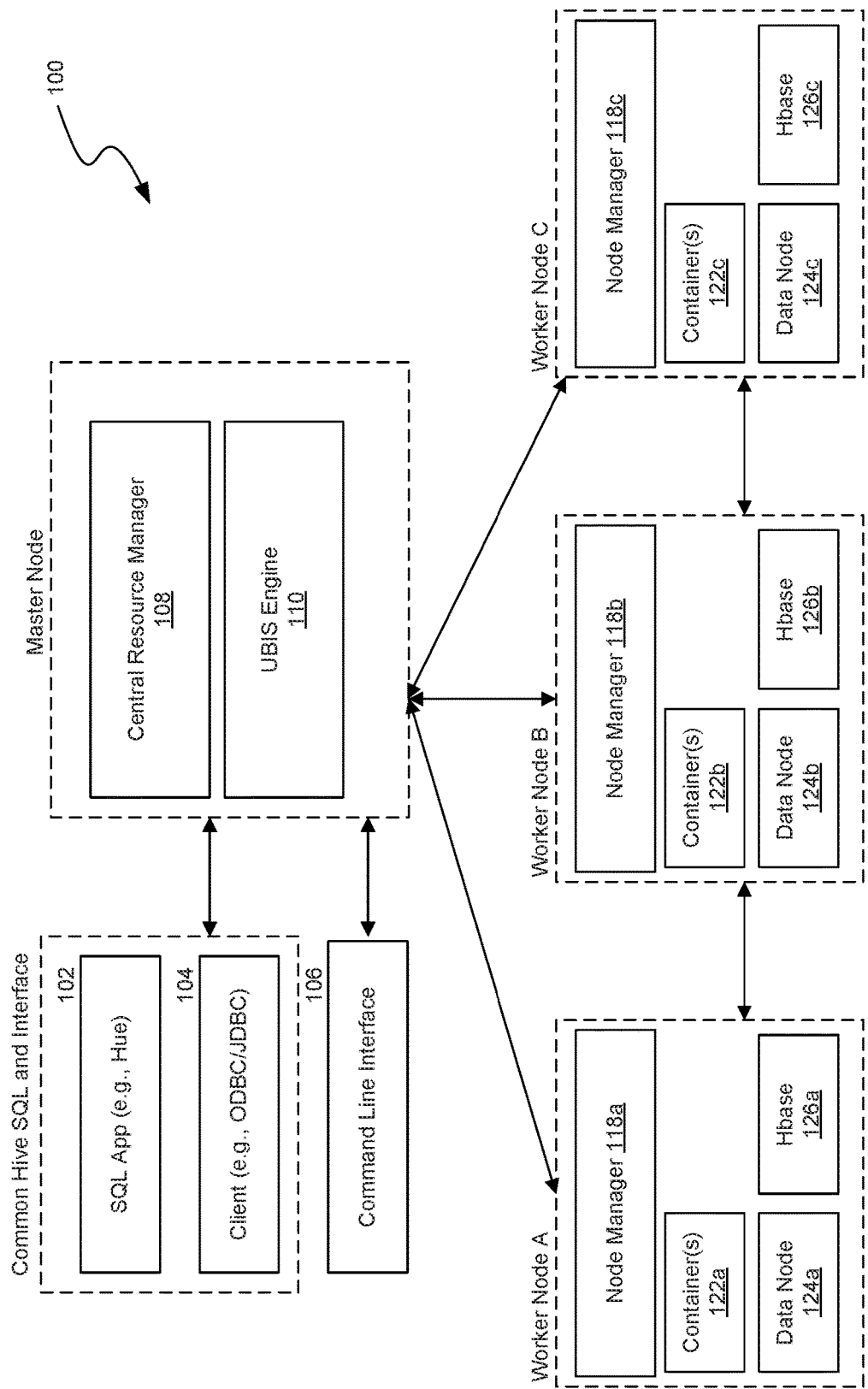
FIG. 1 shows a high-level diagram illustrating an example environment in which utilization-aware resource scheduling can be implemented.

Introduced herein are techniques for utilization-aware cluster scheduling that address the aforementioned problem of underutilization of computing resources in a distributed computing cluster. These techniques are generally referred to herein as UBIS (utilization-based incremental scheduling) and can include scheduling techniques that consider both user-specified requests and the actual utilization of resources at a computing node, including computing resources previously allocated to a container. In an embodiment, once a computing cluster is fully allocated (i.e., no additional tasks can be scheduled based on un-allocated cluster resources), UBIS can opportunistically allocate computing resources not utilized by prior allocations. Such opportunistic allocations are referred to herein as "opportunistic containers." For clarity, containers allocated according to known scheduling techniques (e.g. using existing YARN) are referred to herein as "regular containers." In contrast with so called "regular containers," opportunistic containers use slack in the cluster to improve cluster utilization and job throughput. Oversubscribing node and cluster resources in this manner, however, poses challenges. Oversubscription can become untenable when tasks simultaneously start using more resources, potentially leading to performance degradation, and even task failures. To address this problem, UBIS can preempt opportunistic containers to ease resource contention. However, preemptions limit throughput gains from opportunistic scheduling. To avoid unnecessary preemptions, individual jobs can opt out of opportunistic allocations. In some embodiments, cluster administrators can enable UBIS on a per-node basis to oversubscribe resources at the given node.

The potential for preemption of opportunistic containers in effect creates a hierarchy in container priority. The aforementioned regular containers can be considered as "first-tier containers" that are guaranteed access to the computing resources allocated to the container. Accordingly, opportunistic containers can be considered as "second-tier containers" in that they are subject to de-allocation to guarantee previously allocated computing resources to the first-tier container if the resource utilization rises above a certain level that may impact access by the first-tier container. The container hierarchy can of course include more than two levels. For example, the set of allocated regular containers may be organized into multiple sub-tiers (e.g. based on task priority and or time of allocation). Similarly, a set of allocated opportunistic containers may be organized into multiple sub-tiers (e.g. based on task priority and or time of allocation).

The aggressiveness of opportunistic scheduling can be controlled through a variable parameter. This parameter referred to herein as over-allocation parameter or threshold ($T_{alloc}$). UBIS can monitor and report resource utilization at a node and/or specific container to a scheduler. If the aggregate utilization is under a specified first threshold (e.g. based on $T_{alloc}$) the scheduler may allocate an opportunistic container to process a requested job or constituent task. UBIS can further allow limiting the extent of oversubscription at runtime through a second variable parameter referred to herein as a preemption parameter or threshold ($T_{preempt}$). UBS can preempt (i.e. de-allocate) previously allocated opportunistic containers if the aggregate resource utilization goes beyond a specified second threshold (e.g. based on $T_{preempt}$). Efficiency of resource utilization can thereby be controlled by selecting appropriate values for $T_{alloc}$ and $T_{preempt}$. The appropriate values will differ based on the processing requirements for a given environment, however in general a wider gap between the two thresholds will tend to reduce the likelihood of a node's resource usage actually going over the second threshold. This reduces the likelihood of preemption, while at the same time reducing opportunistic scheduling. The optimal values for these two thresholds for a cluster depend on the workload and resource capacities. For example, while most batch-processing jobs can tolerate preemptions in lieu of potential throughput gains, certain latency-sensitive applications might not be able tolerate preemptions. As will be explained later, these jobs can opt out of opportunistic allocations.

For illustrative purposes, embodiments are described in herein in the context a Hadoop-based distributed computing systems. For example, UBIS can be implemented in or for use with Apache YARN. While these described embodiments are useful for illustrative purposes, they are not to be construed as limiting. For example, while YARN currently supports allocation of containers based on CPU and memory resources, UBIS can be implemented for the allocation of other computing resources including, but not limited to, disk storage, network, GPU (graphical processing), bus, input/output (I/O) resources, etc. Further certain terms used herein such as "node," "job," "task," "workflow," "query," "resource," "container," etc., may have specific definitions in the context of a Hadoop-based system. Again, these should not be construed as limiting the scope of the presently described innovations. The techniques described herein (generally referred to as UBIS) can be applied to the processing of any type of data at any type of distributed system of computing devices (physical and/or virtual).

Distributed Computing Environment

FIG. 1 shows a high-level diagram illustrating an example environment 100 in which UBIS may be implemented. As previously mentioned, the example environment 100 is shown for illustrative purposes in the context of Hadoop, however this is not to be construed as limiting. Further, whether implemented in Hadoop or not, more or fewer components than as shown in FIG. 1 may be included while remaining within the scope of the present teachings. The example environment 100 includes a plurality of data nodes 124a-c that comprise cluster of worker nodes in in communication (e.g. via computer network) with each other and one or more master nodes. Some of the data nodes 124a-c may run just HDFS, while others may run HBase region servers 126a-c.

The environment 100 includes a client 104 such as Java Database Connectivity (JDBC) client, Open Database Connectivity (ODBC) client, and the like that provides API and other tools for connecting and/or accessing a Hadoop distributed computing cluster. SQL applications 102 such as Hue, provide an interface through which users can run queries or jobs, browse the HDFS, create workflows and the like. The environment 100 also includes a command line interface 106 for issuing queries. In one embodiment, the client 104, the SQL application 102 and the command line interface 106, each or together may be commonly referred to as a client.

The environment 100 includes a central resource manager 108 and in some embodiments a secondary resource manager 110. A "resource" in this context may be generally understood to include processing capabilities of the cluster nodes in the distributed computing environment. For example, resources may include processing units (e.g. CPU cores), memory, network bandwidth, and storage space. Resources may be abstracted into units called containers (e.g. containers 122a-c) that may include one or more of the previously mentioned resources. The central resource manager 108 is a general resource manager configured to manage and arbitrate resources among applications in the system. Communicating with node managers 118a-c which act as the agents at each node, the central resource manager 108 may allocate and schedule resources available at the various nodes based on the available resources reported from each node manager 108. In other words, queueing processing tasks until resources are made available. In Hadoop, this basic system of negotiation between a central resource manager 108 and node managers 118a-c is sometimes referred to as Yet Another Resource Negotiator (YARN). As previously discussed, a central resource manager 108 implementing known resource management techniques (such as in YARN) is limited in its ability to prevent over-allocation and wastage of computing resources. To address this limitation, environment 100 may include a second level resource manager such as a UBIS engine 110 capable of implementing novel techniques for utilization-aware resource management as discussed in more detail herein. UBIS engine 110 is shown in FIG. 1 as discrete module separate from central resource manager 108, however it shall be understood that this shows an non-limiting example for illustrative purposes. According to some embodiments, the functionality of the UBIS engine 110 may be integrated into the central resource manager 108. In other words, the novel methods and systems described herein may be implemented on top of an existing resource management architecture (e.g. YARN), or may be integrated into a new resource management system, according to some embodiments.

In some cases, YARN can implement one of several types of schedulers, some of which allow for user input to configure the queuing of jobs, for example to effectuate relative priority among jobs. For example, YARN can implement a fair scheduler that allows an admin to assign weights to certain job queues. The fair scheduler then computes a "fairshare" for each queue/application in a hierarchy based on these weights and priorities the allocation of computing resources based on the calculated "fairshare." In some embodiments, UBIS-based techniques described herein can be implemented within the scheduler in a given YARN deployment.

Elements depicted in the distributed computing environment of FIG. 1 may be implemented across one or more physical and/or virtual computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components. Additional detail regarding components of the one or more computing devices is described with respect to FIG. 8.

In some embodiments, the computing devices (real or virtual) implementing the elements depicted in FIG. 1 may be communicatively coupled via one or more computer networks. The one or more computer networks can include, for example, a wired or wireless local area network (LAN), a wired or wireless wide area network (WAN), a cellular data network, or any combination or variation thereof. Further, the one or more networks can include open networks (e.g. the Internet) and/or private network (e.g. an intranet and/or the extranet). For example, the Internet can provide file transfer, remote log in, email, news, RSS, cloud-based services, and other services through any known or convenient protocol, such as, but is not limited to the TCP/IP protocol, Open System Interconnections (OSI), FTP, UPnP, etc.

The one or more networks can be any collection of distinct networks operating wholly or partially in conjunction to provide connectivity to the computing devices implementing the elements of FIG. 1 and may appear as one or more networks to the serviced devices. In one embodiment, communications to and from computing devices can be achieved by, an open network, such as the Internet, or a private network, such as an intranet and/or the extranet. In one embodiment, communications can be achieved by a secure communications protocol, such as secure sockets layer (SSL), or transport layer security (TLS).

Figure 2:
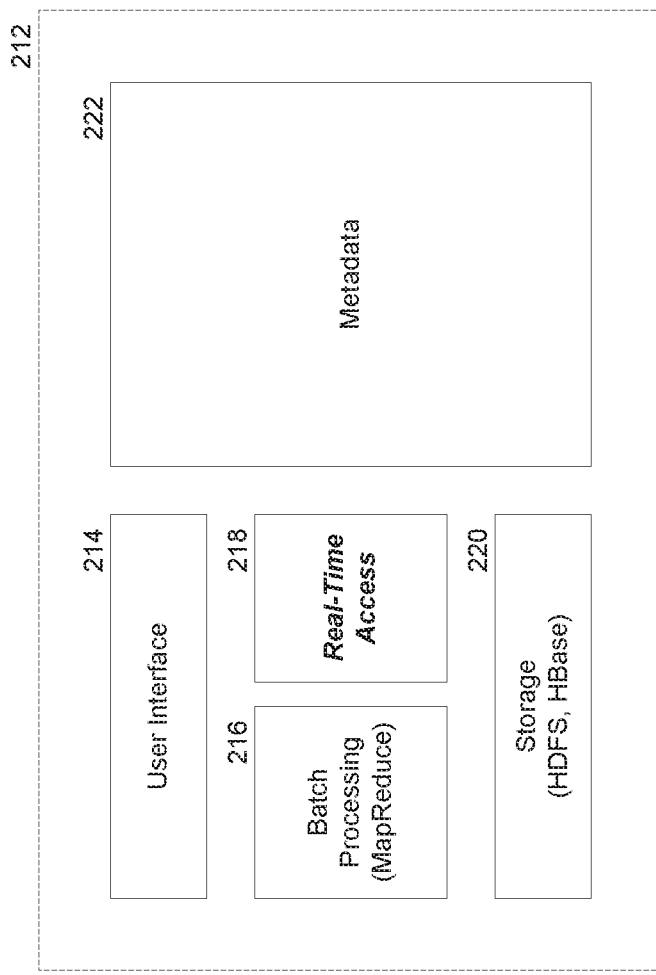
FIG. 2 shows a block diagram illustrating example components of a unified distributed computing platform supporting utilization-aware resource scheduling.

FIG. 2 shows a block diagram illustrating example components of a unified distributed computing platform 212 supporting batch-oriented and real-time, ad hoc queries. The unified Hadoop platform 212 supports distributed processing and distributed storage. The unified Hadoop platform 212 includes a user interface 214, storage 220 and metadata 222 components. The user interface 214 includes Hive interfaces such as ODBC driver, JDBC driver, Hue Beeswax, and the like. The user interface 214 also includes SQL support. Via the user interface 214, queries can be issued, data can be read from or written to storage 220, etc. Through the interface, an administrator user can set policies for resource allocation in processing queries. These policies may inform resource allocation by a central resource manager 108 or UBIS engine 110. The storage 220 includes HDFS and/or HBase storage. The HDFS may support various file formats, including but not limited to: text file, sequence file, RC file, Avro, and the like. Various compression codecs including snappy, gzip, deflate, bzip, and the like may also be supported. The metadata 222 may include, for example, information about tables, their partitions, columns, types, table/block locations, and the like. The metadata 222 may leverage existing Hive metastore, which includes a mapping of HBase tables, predicates on row key columns mapped into start/stop row, predicates on other columns mapped into single column value filters, and the like.

According to some embodiments, a Hadoop platform uses a batch-oriented query engine (e.g., MapReduce) for batch processing 216 of data. The batch processing capability of MapReduce is complemented by a real-time access component 218 in the unified Hadoop platform 212. The real-time access component 218 allows real-time, ad hoc SQL queries to be performed directly on the unified storage 220 via a distributed low latency (LL) query engine that is optimized for low-latency. The real-time access component 218 can thus support both queries and analytics on big data.

Figure 3A:
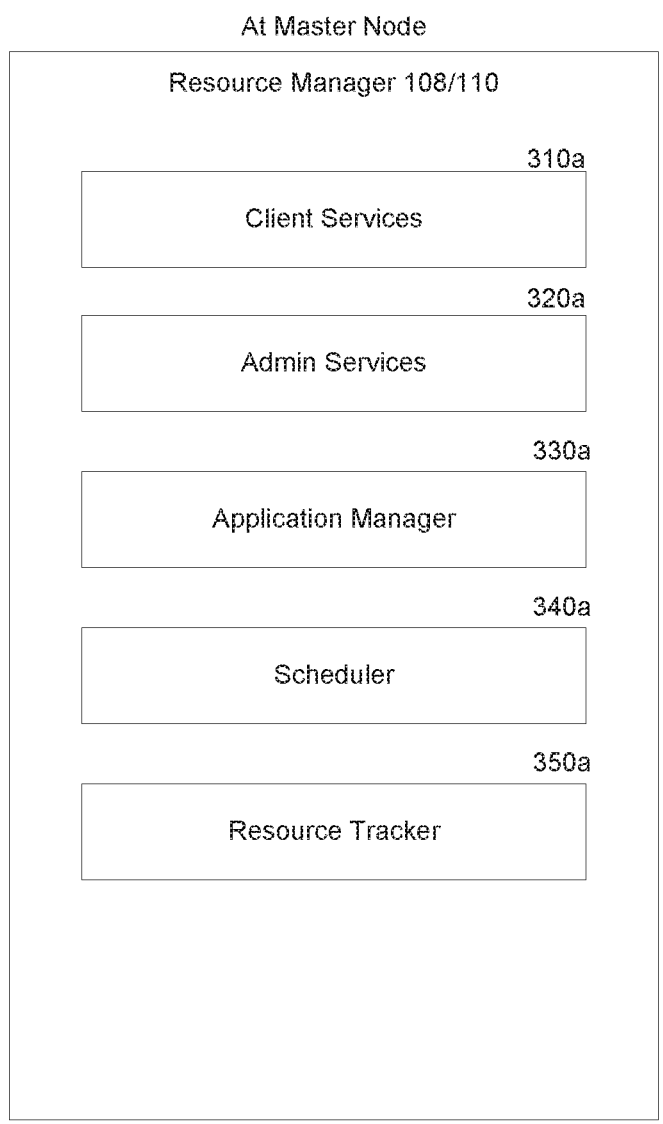
FIG. 3A shows a block diagram illustrating example components of a resource manager daemon installed at a master node in a distributed computing cluster.

FIG. 3A shows a block diagram illustrating example components of a resource manager daemon installed at a master node in a distributed computing cluster. The resource manager daemon shown in FIG. 3A may include components of a central resource manager 108 and/or UBIS engine 110 as shown in FIG. 1. Further, the conceptualized diagram of a resource manager daemon shown in FIG. 3A is an illustrative example according to one embodiment and is not to be construed as limiting. A similar resource manager may include more or fewer components, organized in various configurations, while remaining within the scope of the present disclosure.

According to one embodiment, a resource manager daemon includes a client services module 310a, an administrator services module 320a, an application manager 330a, a scheduler 340a, and a resource tracker 350a.

The client services module 310a provides the interface between the client (e.g., client 102/104) and the resource manager (e.g. resource manager 108/110). For example, the client services module 310a may handle communications (e.g., in the form of remote procedure calls) for requested operations (e.g. a query) to be performed on the cluster.

The administrator services module 320a provides the interface between the client (e.g., client 102/104) and the resource manager (e.g. resource manager 108/110) for administrator services. Further, the administrator services module 320a can prioritize operations requests from administrators over normal users. An administrator can set resource management policies to be followed by the scheduler 340a via the administrator services module 320a.

The application manager 330a is responsible for maintaining a collection of submitted "applications" or "jobs." In this context, the terms "jobs" and "applications" may be used interchangeably, however an application may also include a set of jobs. For example, a MapReduce job may be considered an "application" or a software application such as a Hive instance may be considered an "application" comprising a number of MapReduce jobs at any given time. Further, different instances or accounts for the same software application may be considered distinct applications by the application manager 330a. For example, in an enterprise setting, various departments may have access to Hive-based software for processing queries using a Hadoop Cluster. Each department's use of the software may be separately managed as an "application." The application manager 330a may also include an application master service responsible for communicating with all the application masters 320b at the slave nodes. The application master service can register new application masters 320b, terminate and/or unregister requests from finishing application masters 320b, and obtain container allocation or de-allocation requests from running application masters 320b.

The scheduler 340a is responsible for allocating resources to the various applications subject to constraints queues and policies set by an administrator user. Scheduling is performed based on scheduling algorithms that take into consideration the resource requirements (e.g. memory, processing, data storage, network bandwidth, etc.) of the submitted applications, the administrator policy requirements, and other constraints.

The resource tracker 350a responds to remote procedure calls from the worker nodes. It monitors available resources at the nodes, by receiving status updates from the worker nodes. The resource tracker 350a may also decommission resources at nodes if it does not receive status updates indicating that the node is operational. The resource tracker 350a maintains a list of active and decommissioned nodes and feeds this information to the scheduler 340a to aid in resource allocation.

Figure 3B:
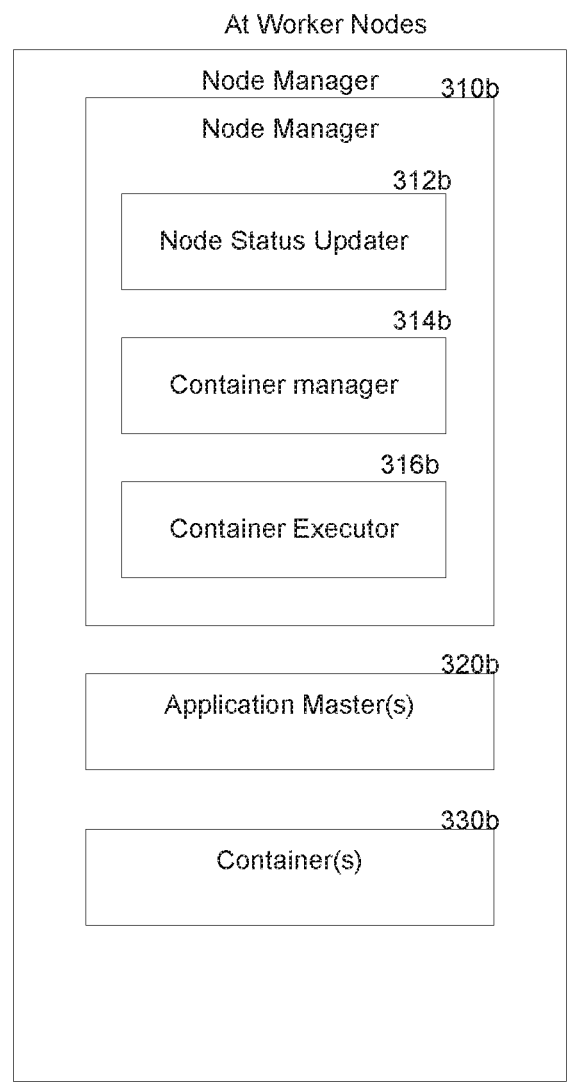
FIG. 3B shows a block diagram illustrating example components of a resource manager daemon installed at worker nodes in a distributed computing cluster.

FIG. 3B shows a block diagram illustrating example components of a resource manager daemon installed at worker nodes in a distributed computing cluster, according to some embodiments. The conceptualized diagram of a resource manager daemon shown in FIG. 3B is an illustrative example according to one embodiment and is not to be construed as limiting. A similar resource manager may include more or fewer components, organized in various configurations, while remaining within the scope of the present disclosure.

According to one embodiment, a resource manager daemon installed at the worker nodes includes a node manager 310b, and one or more application masters 320b. The node manager 310b depicted in FIG. 3B may be the same as or part of node managers 118a-c depicted in FIG. 1. Resources at the worker nodes are abstracted to one or more containers 330b.

The node manager 310b is a per-node agent installed on each of the worker nodes in the cluster. The node manager 310b includes a node status updater 312b that registers with the resource manager and broadcasts the status of the node including the status of available resources (e.g. containers 330b) at the node. For example, the node status updater 312b of the node manager 310b can periodically send heartbeat signals to the resource manager 108/110 that include liveness and the status of containers 330b allocated at the worker node. Status updates may include information about new allocated containers, completed containers, unavailable containers, etc. The node manager 310b also includes a container manager 314b. The node manager 310b can monitor the resource utilization of individual containers, for example, by using a proc filesystem on Unix-based operating systems. Alternatively, in some embodiments, performance monitoring may be improved through more advanced operating system libraries like cgroups in Linux. In some embodiments, the node manager 310b can be augmented to also calculate the aggregate resource utilization across all containers in the worker node. This aggregate information can then be sent to the resource manger 108/110 at the master node to inform UBIS scheduling. In some embodiments, signals sent by the node manager 310b at a worker node to the resource manger 108/110 (e.g. as periodic heartbeats) at the master node can include one or more of (i) the aggregated actual resource utilization at the worker node, and/or (ii) an indication of the willingness of the worker node to accept over-allocation. For example, as previously mentioned, this indicator may be in the form of a parameter or threshold $T_{alloc}$. As previously mentioned, in some embodiment $T_{alloc}$ can be based at least in part on the actual resource utilization at the worker node. This additional information will typically add little overhead to an existing node heartbeat payload.

The node container manager 314b accepts requests from application masters 320b for resources, for example, to start running new containers 330b or stop running old ones, launches and monitors containers 330b at the node, closes containers and/or cleans up processes running in containers in response to requests from the resource manager 108/110, and monitors the containers 314b for resource utilization while processes are running. According to some embodiments, if a container 330b exceeds its resource allocation, the node container manager 314b can kill the errant container so that it does not adversely affect other containers running on the same node. The node manager 310b also includes a container executor 316b that interacts with underlying operating systems to place files and directories and to securely launch and clean up processes running on containers.

Application masters 320b that are specific to each application running on the cluster may be instantiated at each worker node. Application masters 320b are responsible for requesting resources from the resource manager 108/110, working with node managers 310b to manage and monitor the containers 330b allocated by the resource manager 108/110.

Optimizing Resource Utilization

UBIS can be implemented to improve effective resource utilization in a distributed computing cluster. Improvements in effective resource utilization can positively impact metrics that directly impact end users such as makespan (i.e., processing duration) for individual jobs and workloads comprising sets of jobs. Generally speaking, a workload can be viewed as a general directed acyclic graph (DAG) of jobs, where each job comprises several tasks. End-users typically submit workloads and not individual jobs. A single job is the basic unit of a workload, and makespan for a job is simply the job duration. In other words, in some embodiments UBIS can be implemented with a goal of minimizing the overall workspan of submitted jobs and workloads. In many cases this involves striking a balance between over-allocation and guaranteeing allocated cluster resources due to the way in which tasks are processed in a given distributed cluster.

Consider a cluster with R resources (where R is a multi-dimensional vector, with dimensions representing CPU, memory, network, disk, and potentially other resources), and a workload comprising of N jobs with a total of n tasks. A user-specified maximum resource requirement for a given task $T_i$ is denoted as $R_i$. The maximum resource requirement $R_i$ for the given task $T_i$ can be computed by maximizing along each dimension over the execution of the task. At any given time, a cluster scheduler using existing techniques schedules the largest subset of tasks that fit on the cluster as $G=\{T_i|\Sigma R_i \leq R\}$. In other words, adding one more task to the set would yield $\Sigma R_i > R$. The actual resource utilization of a given task $T_i$ running on the cluster is represented as $U_i$. To successfully process the task $T_i$ the actual resource utilization $U_i$ should be less than the maximum resource requirement $R_i$ specified for the task. Therefore, the slack in the cluster due to underutilization can be represented as $R^*=R_i-\Sigma U_i$.

In some embodiments, UBIS can be implemented to schedule opportunistic task that fit within this available slack $R^*$ in the cluster. In other words, a cluster scheduler implementing UBIS (in some embodiments) could schedule the largest subset of tasks that fit within this available slack $R^*$ as $O=\{T_i|\Sigma R_i \leq R^*\}$. However, utilizing all available resources, including previously allocated slack, at any given time can lead to resource contention between competing tasks due to temporal variations in resource utilization. Such resource contention can, in some cases, lead to failure of certain tasks. Depending on task/job/workload characteristics, failure of one task can in some cases negatively impact the makespan of a corresponding job and/or workload. In other words, maximum overall resource utilization does not necessarily yield the optimal effective resource utilization. The associated loss in performance can be represented as $\Delta t_i$, where $t_i$ is the duration of task $T_i$. In cases of extreme contention between tasks for resources, a select number of tasks (p) may need to be preempted (i.e. suspended and/or de-allocated) to ensure that oversubscription in the cluster remains tenable. Accordingly, the following observations can be made in such a scenario:

Makespan is inversely related to the number of tasks run in parallel.

Makespan grows with individual task duration ($t_i+\Delta t_i$).

The increase in task duration ($\Delta t_i$) due to resource contention grows with number of tasks run in parallel. For an unsustainable number of scheduled tasks, the overhead may cause significant thrashing.

Makespan grows with number of preemptions (p).

The optimal makespan will therefore correspond to the largest value of utilized slack for which resource contention is manageable (i.e. where $\Delta t_i$ and p are minimized). This will depend on the workload being processed as well as the cluster resources.

Example UBIS Process—Scheduling Opportunistic Containers

Figure 4:
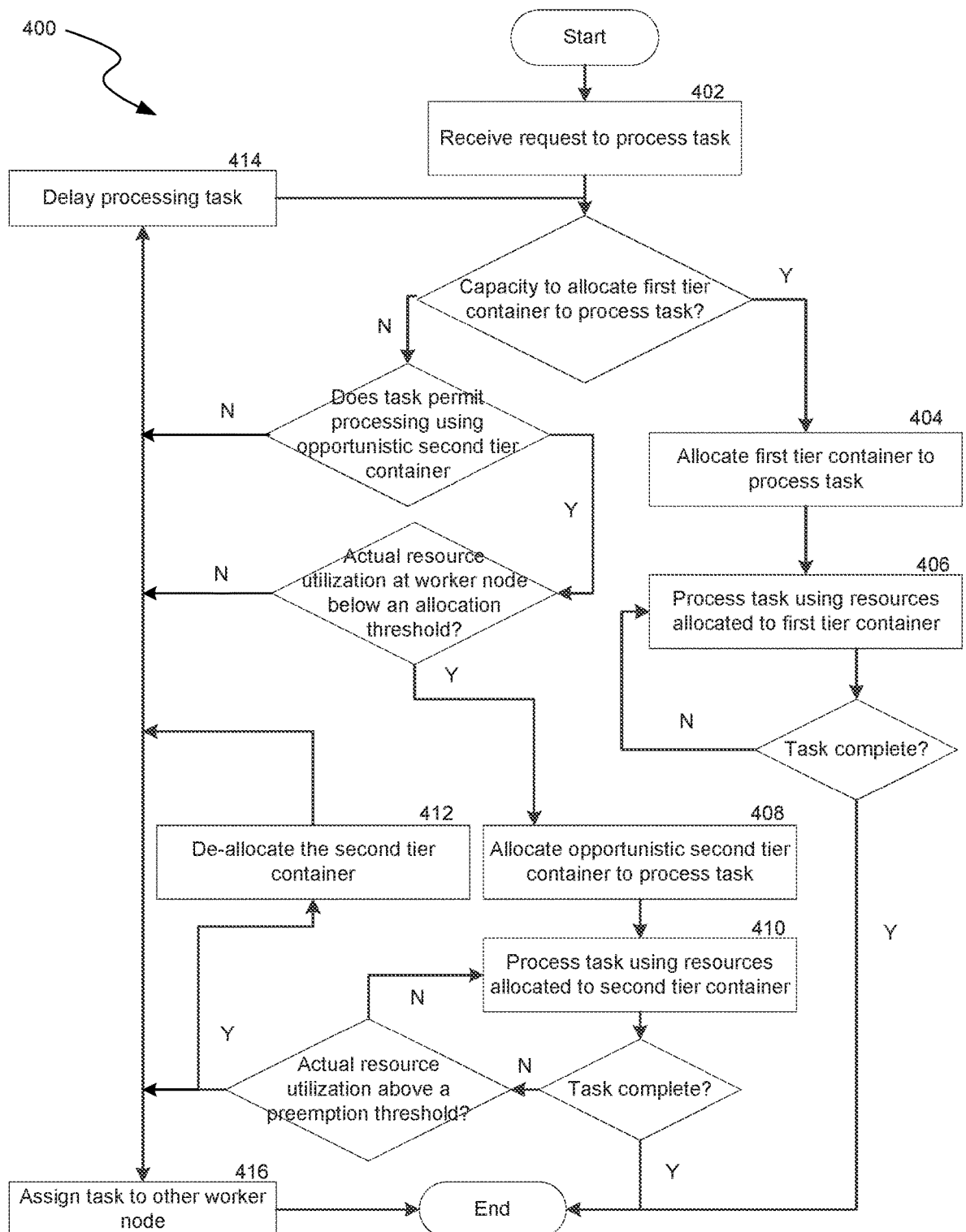
FIG. 4 shows a flow diagram illustrating an example process for utilization-aware resource scheduling in a distributed computing environment.

FIG. 4 is a flow chart describing an example UBIS process 400 that includes the scheduling of opportunistic containers. For clarity and illustrative purposes, the steps of process 400 are described with respect to the Hadoop-based computing environment illustrated in FIGS. 1-3B. However, a person having ordinary skill will recognize that process 400 may be carried out in a distributed computing cluster that does not necessarily conform with the architectural components illustrated in FIGS. 1-3B. Further process 400 shown in FIG. 4 is an example of a process that incorporates techniques for UBIS. Other embodiments of UBIS may implement processes that order the steps differently and/or include more or fewer steps than as illustrated in FIG. 4.

The example process 400 begins at step 402 with receiving a request to process a task in a distributed computing cluster. The task may be part of a job or workload (set of jobs) submitted for processing in a distributed computing cluster. Jobs and/or workloads may be submitted by end-users (e.g. via clients 102/104) and are received at a master node (e.g. at a resource manager 108/110 associated with the cluster. The jobs and/or workloads may include user-specified resource requirements.

As previously mentioned, in certain embodiments the resource manager 108/110 receives periodic heartbeat signals from the node mangers 310b at the worker nodes. When a node heartbeats, the scheduler 340a at the resource manager 108/110 updates its book-keeping for any containers completed since the last heartbeat, and any resource capacity updates. If a worker node includes unallocated capacity to process the task (i.e. based on the requested resources) the scheduler 340a at step 404 allocates or causes the allocation of one or more regular (i.e. first-tier) containers to process the requested task.

Figure 5:
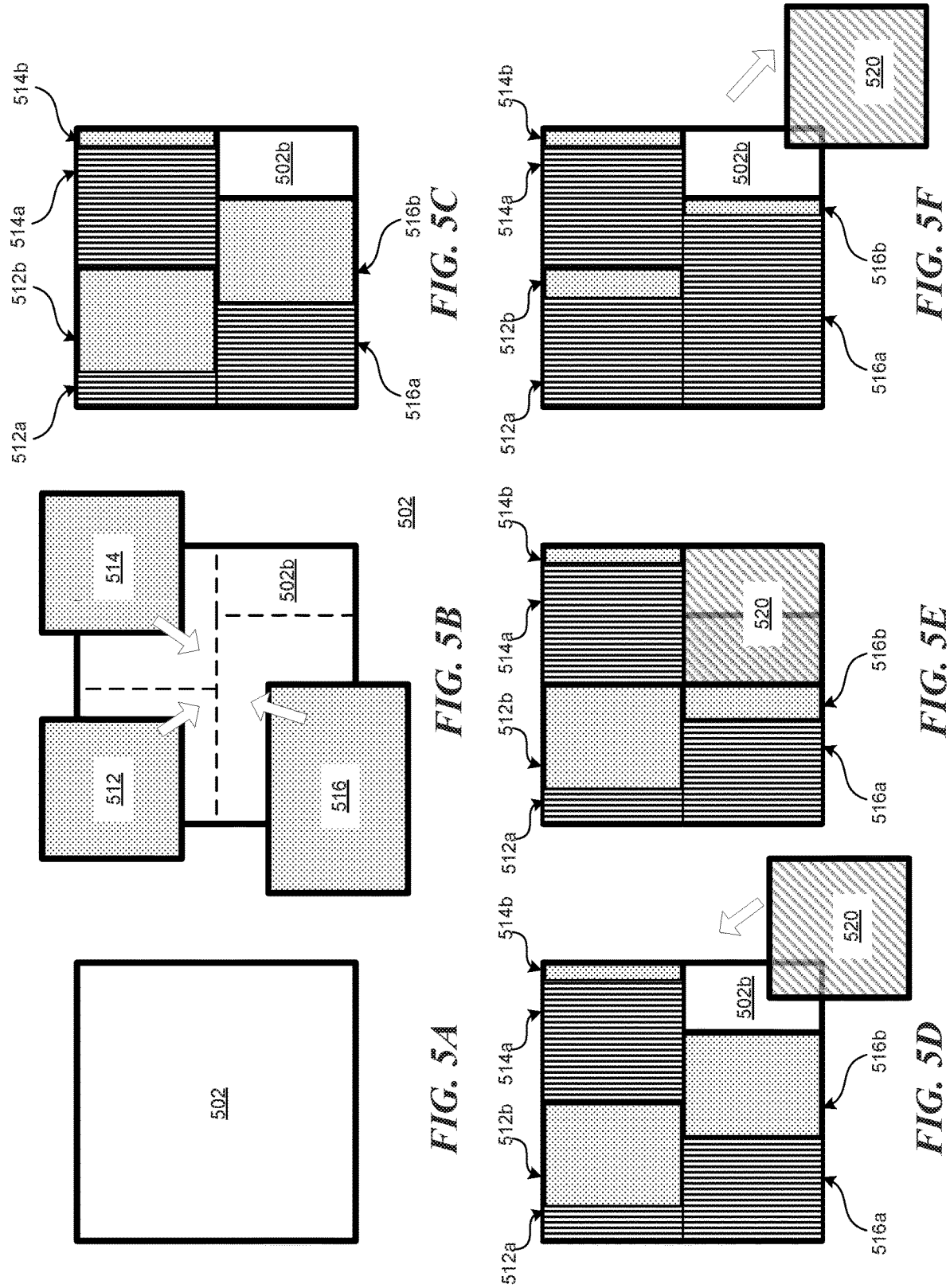
FIGS. 5A-5F show a series of conceptual graphical representations of resource allocation at a worker node using techniques described herein.

FIGS. 5A-5F serve to further illustrate portions of the process 400 described with respect to FIG. 4. Specifically, FIGS. 5A-5F include a series of graphical representations of resource allocation at a particular worker node at different times. It shall be understood that the graphical representations are conceptual and do not necessarily correspond with how resources are actually arranged in practice. Further, the representations in FIGS. 5A-5F are exemplary and are not intended to limit the present teachings to particular processes for resource allocation. Element 502 shown in FIG. 5A conceptually represents a set of unallocated resources (e.g., at a particular worker node). Again, the resources may be multi-dimensional and include processing, memory, storage, network etc. To process requested tasks, a scheduler can allocate one or more regular first-tier containers as represented by elements 512, 514, and 516 shown in FIG. 5B. The containers may be sized according to task resource requirements or may be standardized. Because allocated resources are guaranteed to each regular container, the elements 512, 514, and 516 are represented in FIG. 5B to fit within the span of available resources represented by element 502 while not overlapping each other.

Returning to FIG. 4, the task is then processed at step 406 using the resources allocated to the one or more regular containers. As previously mentioned, regular first-tier containers include allocated resources that are guaranteed. In other words, the task will continue to process at step 406 without any risk of de-allocation of the regular container. In some embodiments where a number of requested tasks are pending, the scheduler 340a may iterate through the waiting tasks (e.g. in an order determined by fairness constraints and queue weights) to check if the worker node meets the resource size and placement requirements (say, for data locality) for the task. The scheduler 340a continues to allocate regular containers at a particular worker node, as long as it has enough resources to meet a job's pending request.

If, however, a particular worker node or all of the nodes in the cluster do not have enough unallocated resources available to allocate a regular first-tier container (i.e. the scheduler 340a has completed allocating regular containers), process 400 continues with determining whether to opportunistically allocate unused (but previously allocated) resources to process the task. As will be described, in some embodiments, tasks may opt out of the opportunistic resources scheduling by UBS. For example, some tasks may not be able to tolerate any risk of preemption by higher tiered containers. Accordingly, in some embodiments, determining whether to allocate an opportunistic container includes first determining whether the requested task permits processing using opportunistic containers. If the task does not permit processing using an opportunistic container, the requested task may at step 414 be delayed (e.g. placed back into a job queue). Alternatively, if resource availability has opened up at any of the other worker nodes in the cluster the scheduler 340a may opt to re-assign the requested task to another worker node and allocate a first-tier container at that node to process the task.

Assuming that the requested task permits, there may be an opportunity to allocate a second-tier opportunistic container to process the task. Consider again the graphical representations of resource allocation shown at FIGS. 5A-5F. During processing of tasks using previously allocated regular containers, some of the resources in the regular containers may be utilized, however at any given time some of the allocated resources may remain unutilized. For example, FIG. 5C shows the regular containers (represented by elements 512, 514, and 516) broken down into utilized portions and unutilized portions. Specifically, at a given time, tasks processed at regular containers represented by elements 512, 514, 516 may only utilize the resources represented by elements 512a, 514a, 516a (respectively) leaving the allocated resources represented by elements 512b, 514b, 516b unutilized. In other words, the resource slack at the worker node represented in FIGS. 5A-5F at any given time can be represented as the sum of the unutilized allocated resources 512b, 514b, 516b, and the unallocated resources 502b.

Figure 6:
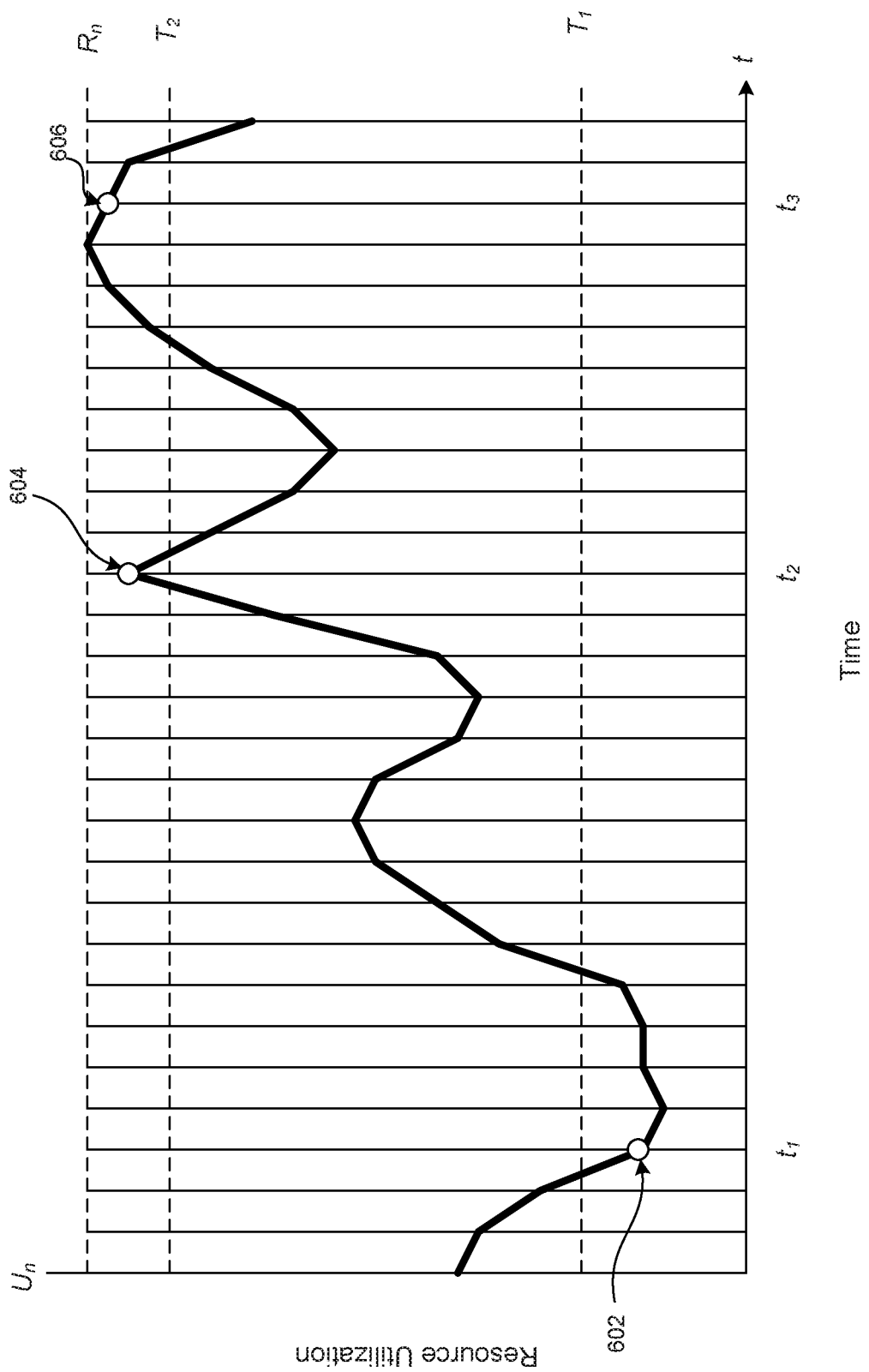
FIG. 6 shows a line graph that plots resource utilization at an example worker node over time.

As soon as resource slack at a worker node develops there may be an opportunity to opportunistically allocate some or all of that slack. As previously mentioned, the maximum quantity of resources that may be opportunistically allocated at any given time is equal to the total resource slack at that given time. However, due to temporal fluctuations in resource utilization, opportunistically allocating all of the slack and/or opportunistically allocating as soon as slack develops can lead to contention. Instead, the scheduler 340a can determine whether to allocate an opportunistic second-tier container based on whether actual resource utilization at a particular node satisfies a condition for opportunistic scheduling. For example, in an embodiment, the scheduler 340a may only allocate an opportunistic second-tier container if the actual resource utilization is below an allocation threshold. In other words, the scheduler 340a may only allocate an opportunistic container to process a task if the worker node has available unused resources to process the task (according to the task's requirements), wherein the quantity of available resources takes into account the worker node's willingness to take on opportunistic containers (e.g. the variable allocation parameter $T_{alloc}$). For example, FIG. 6 shows a line graph (not to any particular scale) that plots resource utilization $U_n$ at an example worker node over time, t. As shown in FIG. 6, an opportunistic second container may be allocated at $t_1$ (represented by point 602 along the graph) as resource utilization falls below a first threshold $T_1$. Again, the first threshold $T_1$ may at least in part be based on a variable allocation parameter $T_{alloc}$, (e.g., $T_1=T_{alloc} \times R_n$, wherein $R_n$ is the resource capacity at the worker node and $T_{alloc}$ has a value between 0 and 1). Note that the line graph of FIG. 6 is an example provided for illustrative purposes and is not to be construed as limiting. Further, the placement of thresholds $T_1$ and $T_2$ along the y-axis of the line graph are not necessarily to scale relative to each other or to the overall resource capacity $R_n$ of the node.

In an embodiment, a system implementing UBIS identifies resource slack at each worker node from unused resources of previously allocated running containers. For this, UBIS can actively monitor resource usage of each container at the worker nodes and of the worker nodes themselves. For example, the node managers 310b at worker nodes can heartbeat liveness information to the resource manager 108/110 at the master node periodically. As previously mentioned, this heartbeat information can further include utilization information as well as an indicator of the worker node's willingness for over subscription (e.g. the variable over-subscription parameter, $T_{alloc}$). A scheduler 340a can allocate opportunistic containers at a given worker node if the actual resource utilization $U_n$ at the worker node hits or falls below a threshold equal to $T_{alloc} \times R_n$, where $R_n$ is the worker node's resource capacity for running containers and $T_{alloc}$ has a value between 0 and 1. Note that in some embodiments, the actual resource utilization $U_n$ may need to just hit the threshold of $T_{alloc} \times R_n$, while other embodiments may require that the actual resource utilization $U_n$ fall below this threshold. As mentioned, in some embodiments, the resource manager 108/110 may receive periodic heartbeats from the node managers 310b at worker nodes. Accordingly, in some embodiments, this determination may be made by the resource manger 108/110 each time a heartbeat signal is received (e.g., every 1 second). In some embodiments, to remain conservative and avoid over allocation due to momentary drops in actual utilization, the scheduler 340a of the resource manager 108/110 may require that actual resource utilization $U_n$ remain at or below the threshold of $T_{alloc} \times R_n$ for a certain period of time before determining that conditions are met for opportunistic scheduling. For example, in an embodiment, the scheduler 340a may wait until the actual resource utilization $U_n$ has remained at or below the threshold of $T_{alloc} \times R_n$ for a predetermined number of periodic heartbeats (e.g. 10 heartbeats). The resources available at a worker node for opportunistic scheduling at any given time can similarly be expressed as $(T_{alloc} \times R_n) - U_n$. Therefore, in some embodiments, a requested task with a user-specified maximum resource requirement R can be opportunistically scheduled if $R_i \leq (T_{alloc} \times R_n) - U_n$ at the worker node. Analogizing to the graphical representations resource allocation in FIGS. 5A-5F, an opportunistic container as represented by element 520 can be allocated to process a requested task if its area is less than or equal to the total area of the element 502 multiplied by $T_{alloc}$ minus the sum of the areas of 512a, 514a, and 516a (e.g. as shown in FIGS. 5D-5E).

In some embodiments, the variable allocation parameter $T_{alloc}$ may be set at a particular value (e.g., between 0 and 1). The $T_{alloc}$ parameter can also be generalized to a vector, with dimensions representing different resource types. While the parameter $T_{alloc}$ may be cluster-wide, in some embodiments it may be specific to a worker node given the characteristics and/or capabilities of the worker node. For example, in practical implementations, worker nodes may have different hardware, storage hot-spots, and other deployed software. Further, in some embodiments, the parameter $T_{alloc}$ may be job specific. Some job types may be more amendable to opportunistic scheduling than others.

The optimal values for $T_{alloc}$ will depend on worker node resources and the workload scheduled on the node. A high value for $T_{alloc}$, indicating a high willingness to oversubscribe resources will lead to a high number of opportunistic containers. This is sustainable if the utilization of running containers remains steady. However, major fluctuations in utilization can lead to severe contention and preemptions. In practice, optimal values for $T_{alloc}$, may be arrived at through trial-and-error. For example, a cluster administrator may run a series of predictable workloads and track the overall sensitivity to varying values for $T_{alloc}$, whether implemented cluster wide or at specific nodes. Tools can be provided (e.g. via a user interface 214 of a unified distributed computing platform 212) that can enable a cluster administrator to fine tune values for $T_{alloc}$, (cluster wide, on per node basis, on a per job-type basis, etc.). To inform these adjustments by the cluster administrator, real-time and/or historical data regarding cluster utilization and performance can be provided as well.

Setting values for $T_{alloc}$, using trial-and-error may work in some implementations, however may be impractical in others. Accordingly, in some embodiments, values for $T_{alloc}$ (cluster wide, on per node basis, on a per job-type basis, etc.) can be set automatically using certain optimization techniques. For example, optimal value for $T_{alloc}$ may be determined through a feedback loop from past runs, for example by using gradient-descent.

Returning to FIG. 4, assuming the conditions for opportunistic allocation are satisfied, the scheduler 340a may at step 408 allocate an opportunistic second-tier container and at step 410 begin processing the requested task using the resources of the opportunistic second-tier container. If the conditions for opportunistic scheduling are not met, the requested task may at step 414 be delayed (e.g. placed back into a job queue). Alternatively, if resource availability has opened up at any of the other worker nodes in the cluster the scheduler 340a may opt to re-assign the requested task to another worker node to process the task.

In some embodiments, the above described process of scheduling opportunistic containers can be performed as long as the conditions for opportunistic scheduling (based on resource utilization) are satisfied at a particular node. Further, as previously alluded to, in some cases, subsequently allocated opportunistic containers may be of a different tier than previously scheduled opportunistic containers. For example, although not shown in FIG. 4, in an embodiment process 400 may continue with the scheduler 340a allocating an opportunistic third-tier container at the particular worker node to process another task in response to determining that the actual computing resource utilization at the particular worker node is below an allocation threshold. In this example, the opportunistic third-tier container may include underutilized computing resources previously allocated to regular first-tier container and/or opportunistic second-tier containers. Due to its lower tier status, the opportunistic third-tier container would be subject to de-allocation to guarantee the computing resources to the regular first-tier container and/or the opportunistic second-tier container if the actual computing resource utilization at the particular worker node rises above a particular threshold.

Example UBIS Process—Avoiding Adverse Effects of Opportunistic Containers

The addition of opportunistic containers for improved utilization can lead to contention, sometimes severe enough to render a worker node unusable. In such situations, the node manager 310b (or even the operating system) may not be able to take corrective action to prevent processing failures. To avoid these adverse conditions, task executing in opportunistic second-tier containers can be subject to preemption to guarantee previously allocated resources to regular containers before processing task enter into an unrecoverable state. In some cases, this may involve de-allocating an opportunistic container before the task has completed.

Accordingly, while processing a task using an allocated opportunistic container at step 410, process 400 may further include determining whether to preempt the task, if necessary, to guarantee resources to regular first-tier containers. For example, in an embodiment the scheduler 340a may opt to preempt the task running in an opportunistic second-tier container if the actual resource utilization rises above a preemption threshold. Similar to the allocation threshold, the preemption threshold may, at least in part, be based on a variable preemption parameter $T_{preempt}$. For example, in an embodiment, a task running in an opportunistic container may be preempted if actual utilization $U_n$ hits or rises above $T_{preempt} \times R_n$, where $R_n$ is the worker node's resource capacity for running containers and $T_{preempt}$ has a value between 0 and 1. Similarly, in some embodiments, a task with user-specified resource requirement $R_i$ may be preempted if $R_i \geq (T_{preempt} \times R_n) U_n$.

In some embodiments, to remain conservative and avoid unnecessarily preempting certain tasks due to momentary spikes in actual utilization, the scheduler 340a of the resource manager 108/110 may require that actual resource utilization $U_n$ remain at or above the threshold of $T_{preempt} \times R_n$ for a certain period of time before determining that conditions are met for preempting the executing task. For example, in an embodiment, the scheduler 340a may wait until the actual resource utilization $U_n$ has remained at or above the threshold of $T_{preempt} \times R_n$ for a predetermined number of periodic heartbeats (e.g. 3 heartbeats). This is illustrated in FIG. 6 in which the momentary spike in actual resource utilization over a second threshold $T_2$ at time $t_2$ (shown at point 604) may not trigger preemption, while sustained utilization above $T_2$ at time $t_3$ (shown at point 606) does trigger preemption.

Preemption of an opportunistic second-tier container may involve different steps. For example, in an embodiment of process 400 described with reference to FIG. 4, the opportunistic second-tier container may be de-allocated at step 412 resulting in termination of any task processing in the opportunistic container. Once the opportunistic container is de-allocated, the requested task may at step 414 be delayed (e.g. placed back into a job queue). Consider again the graphical representations resource allocation in FIGS. 5A-5F. As shown in FIG. 5E tasks may continue to execute in an opportunistic container (as represented by element 520) as long as the resource utilization conditions permit. However, increases in overall resource utilization may trigger preemption of these tasks. For example, FIG. 5F shows a condition in which resource utilization (represented by elements 512a, 514a, and 516a has increased in one or more of the previously allocated regular first-tier containers (represented by elements 512, 514, 516). If the remaining unused slack (i.e. the sum of the of the unutilized allocated resources 512b, 514b, 516b, and the unallocated resources 502b) are not sufficient to process the tasks executing in opportunistic container or the actual resource utilization has risen above a certain threshold, the scheduler 340a may elect to de-allocate the opportunistic container represented by element 520 as shown in FIG. 5F.

Alternatively, if resource availability has opened up at any of the other worker nodes in the cluster, the scheduler 340a may opt to re-assign the requested task to another worker node and allocate a regular first-tier container or opportunistic second-tier container at that node to process the task. In many cases, de-allocation of an opportunistic container and the resulting termination of the task executing in the container will necessitate restarting the task at a later time (either at another worker node or in a newly allocated container in the same worker node). However, in some cases, tasks may be able to preserve any partially performed work, for example, through the use of check-pointing. Enabling the resumption of tasks after resource de-allocation coupled with cross-node container promotion would further incentivize tasks not to opt out of opportunistic scheduling.

In some embodiments preemption of a task executing in a task may not necessarily lead to de-allocation of the opportunistic container. For example, in an embodiment, the node manager 310b may suspend a task executing in an opportunistic container for a predetermined period of time or until actual resource utilization meets a certain condition (e.g. falls below the first threshold) so that tasks executing in the regular first-tier containers are not interrupted. Once the other tasks complete or actual resources utilization conditions improve, the node manager 310b may again resume execution of the task previously executing the opportunistic container.

In some embodiments, the determination of whether to preempt a task executing in an opportunistic container is made by the scheduler 340a at the master node. For example, in an embodiment the scheduler 340a may de-allocate a previously-allocated opportunistic second-tier container in response to determining that actual computing resource utilization at a worker node has risen above a threshold (e.g. $T_{preempt} \times R_n$) such that other tasks are not interrupted. Alternatively, in some embodiments a worker node may make this determination without any input form the master node. For example, in an embodiment, a node manager 310b at a worker node may de-allocate a previously-allocated opportunistic second-tier container in response to determining that actual computing resource utilization has risen above a threshold (e.g. $T_{preempt} \times R_n$) such that other tasks at eh node are not interrupted. In such embodiments, the node manager 310b may inform the scheduler 340a that the opportunistic container was de-allocated without completing the requested task, thereby prompting the scheduler 340a to restart the allocation process perform the task.

In some embodiments, the variable preemption parameter $T_{preempt}$ may be set at a particular value (e.g. between 0 and 1). The $T_{preempt}$ parameter can also be generalized to a vector, with dimensions representing different resource types. While the parameter $T_{preempt}$ may be cluster-wide, in some embodiments it may be specific to a worker node given the characteristics and/or capabilities of the worker node. For example, in practical implementations, worker nodes may have different hardware, storage hot-spots, and other deployed software. Further, in some embodiments, the parameter $T_{preempt}$ may be job specific. Some job types may be more amendable to opportunistic scheduling than others.

In some embodiments, preemption may be handled differently for different resource types depending on the effects of resource deprivation; specifically, the extent to which resource deprivation may lead to performance degradation and failures. For example, contention over memory can easily lead to task failures. Contention over CPU resources, on the other hand, may causes performance degradation for small amounts of contention but typically will not lead to task failure unless contention is very high. In other words, some computing resources (such as CPU, disk, and network) can be referred to as "malleable" while other computing resource (such as memory) may be considered "non-malleable." In certain embodiments, extra care is taken to ensure that overall utilization of non-malleable resource remains well below capacity. Accordingly, the previously described Too, and $T_{preempt}$ parameters may therefore be set on a per-resource basis as well as a per-node basis. For example, to protect against over-subscription of non-malleable resources, $T_{alloc}$ and/or $T_{preempt}$ may be set at relatively low values. This will result in a lower willingness by the worker node to accept opportunistic scheduling of containers for such resources as well as a higher willingness to preempt tasks executing in opportunistic containers if they are allocated.

Similar to $T_{alloc}$, the optimal values for $T_{preempt}$ will depend on worker node resources and the workload scheduled on the node. A high value for $T_{preempt}$ indicating a low willingness to preempt opportunistic containers will lead to fewer preemptions. This is sustainable if the utilization of running containers remains steady. However, major fluctuations in utilization without preemptions can lead to severe contention. In practice, optimal values for $T_{preempt}$ may be arrived at through trial-and-error. For example, a cluster administrator may run a series of predictable workloads and track the overall sensitivity to varying values for $T_{preempt}$, whether implemented cluster wide or at specific nodes. Tools can be provided (e.g. via a user interface 214 of a unified distributed computing platform 212) that can enable a cluster administrator to fine tune values for $T_{preempt}$ (cluster wide, on per node basis, on a per job-type basis, etc.). To inform these adjustments by the cluster administrator, real-time and/or historical data regarding cluster utilization and performance can be provided as well.

Setting values for $T_{preempt}$ using trial-and-error may work in some implementations, however may be impractical in others. Accordingly, in some embodiments, values for $T_{preempt}$ (cluster wide, on per node basis, on a per job-type basis, etc.) can be set automatically using certain optimization techniques. For example, optimal value for $T_{preempt}$ may be determined through a feedback loop from past runs, for example by using gradient-descent.

Promotions and Opt-Out Provisions

Prioritizing regular containers helps with their predictability and performance. Opportunistic containers, on the other hand, are run at a lower priority and can be preempted more frequently. Many jobs do not have service level agreements (SLAs) and can accommodate opportunistic containers for anticipated gains in makespan. However, some jobs cannot tolerate these preemptions and need the scheduler 340a to offer regular containers at the same rate, irrespective of any additional opportunistic containers.

Figure 7A:
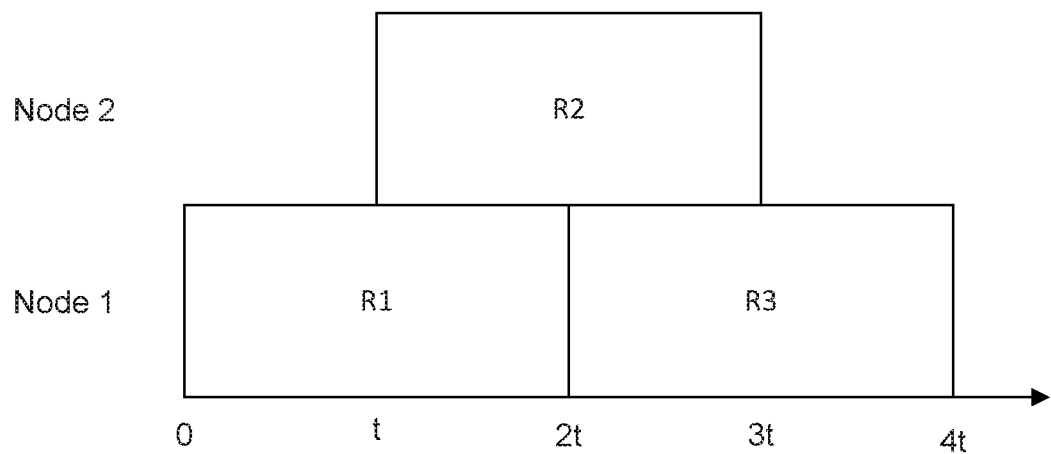
FIG. 7A shows a graph that illustrates a schedule for an example task that does not include opportunistic resource scheduling
Figure 7B:
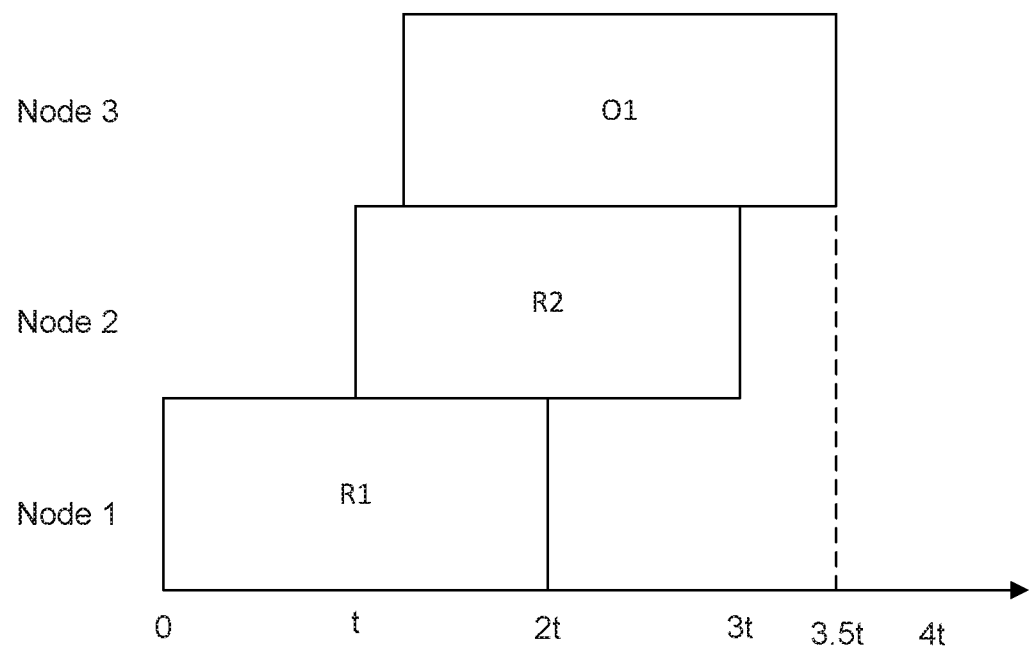
FIG. 7B shows a graph that illustrates a schedule for the example task of FIG. 7A that does include opportunistic resource scheduling.

In certain cases, it is possible a job is allocated opportunistic containers, but the allocation of regular containers is delayed. Consider a job with three tasks, where each task runs for 2t units of time when run as a regular container. FIGS. 7A and 7B illustrate an example task schedule in such a scenario. As shown in FIG. 7A, without the possibility of opportunistic containers, a new regular task is scheduled at regular containers R1-R3 every t units of time resulting in the job taking a total of 4t units of time to complete. Alternatively, with opportunistic containers enabled the third task can be scheduled as an opportunistic container O1 on Node 3, as shown in FIG. 7B. As per the schedule, without opportunistic containers, the third task would have been allocated at a regular container R3 on Node 1 at time 2t. During the time interval 2t to 3t, the job has fewer regular containers than the base case. In spite of this, the particular job represented in FIG. 7B benefits from the opportunistic allocation finishing at time 3.5t, even though processing of the task in an opportunistic container O1 may have taken slightly longer than in a regular container R3.

To address concerns related to opportunistic scheduling, a system implementing UBIS may attempt to promote opportunistic containers over regular containers. Same node promotions are typically straightforward and beneficial. The scheduler 340*a* at a master node and node manager 310*b* at a worker node can update their book-keeping and address any isolation settings. Cross node promotions may be more involved, however. If a particular job does not have a way to checkpoint and migrate the task in a work-preserving manner, the task must be killed on one node and restarted from the beginning on another node. As a result, cross-node preemption may lead to longer runtime than letting the opportunistic container run and perhaps suspending the task at the opportunistic container.

If a job's SLA requirements are tight and same node promotions alone are not enough to guarantee them, a system implementing UBIS can allow these jobs to opt out of opportunistic allocation altogether. Alternatively, instead of statically opting out of all opportunistic allocation beforehand, jobs may be configured to make elections at specific points during execution. For example, a MapReduce job with large shuffle data might not want to run reduce tasks in opportunistic containers, since the cost of preemption is high. This is because all the shuffle data for the task must be transferred again. However, opportunistic containers may be particularly well-suited to speculative tasks.

As previously mentioned, in some cases, tasks may be able to preserve any partially performed work, for example, through the use of check-pointing. Enabling the resumption of tasks after resource de-allocation coupled with cross-node container promotion would further incentivize tasks not to opt out of opportunistic scheduling.

Honoring Fairness

In some embodiments, the distributed computing cluster is configured to be utilized by multiple tenant users. In such embodiments the scheduler 340*a* may include one or more fairness schedulers configured to promote the fair sharing of computing resources among users of the cluster. In general, a fairness-based scheduler can be configured to honor one or more of the following characteristics:

Sharing incentive: Users should have an incentive to share a distributed computing cluster. If there are n users sharing a cluster, each user should be allocated at least 1/n of all resources in the cluster. Otherwise, users might be better off running their own partition.

Strategy-proof: A user should not get a larger allocation by misrepresenting her resource requirements. For example, a user should not get more resources just by asking for larger containers.

Envy-free: A user should not prefer the allocation of another user. That is, one user should not be allocated more resources or higher quality resources than another.

Pareto-efficiency: On a fully allocated cluster, one user cannot be assigned more resources without adversely affecting another user's allocation.

In some implementations, a fair scheduler in YARN can be configured to implement max-min fairness as well as one or more of the above characteristics. As previously mentioned, in the allocation of regular first-tier containers, UBIS may build upon scheduling techniques implemented, for example in YARN. In other words, unallocated resources in a distributed computing cluster can be fairly allocated as regular first-tier containers using existing scheduling techniques, for example included in YARN. In some embodiments, opportunistic second-tier containers are allocated only when the scheduler 340*a* cannot allocate any more regular first-tier containers. The set of opportunistic containers can therefore be allocated using similar fairness techniques to the pool of unutilized resources, instead of unallocated resources, leading to fair allocation of unutilized resources among tenant clients. If a job opts out of opportunistic scheduling, it is not allocated an opportunistic container and its share of the unutilized resources can be distributed among the other competing jobs.

A system implementing UBIS therefore can be configured to implement any one or more of the above-mentioned fairness characteristics and further incentivizes the sharing of computing resources in a cluster among users. In addition to unallocated resources, users can be allocated opportunistic containers when other users are not fully utilizing their regular containers.

Example Computing System

Figure 8:
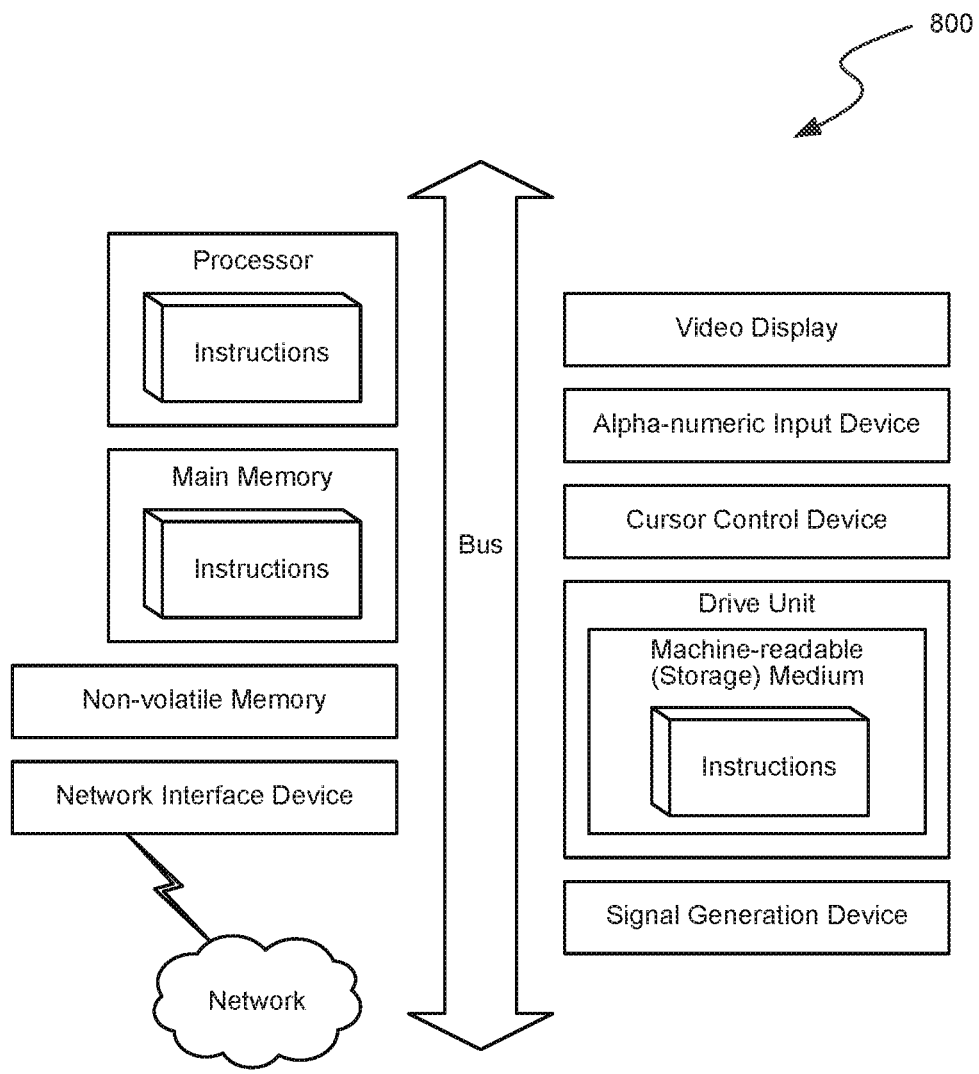
FIG. 8 shows a diagrammatic representation of a machine in the example form of a computer system within which a set of instructions, for causing the machine to perform any one or more of the techniques discussed herein.

FIG. 8 shows a diagrammatic representation of a machine in the example form of a computer system within which a set of instructions, for causing the machine to perform any one or more of the methodologies discussed herein.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIG. 1 (and any other components described in this specification) can be implemented. The computer system 800 can be of any applicable known or convenient type. The components of the computer system 800 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Disclaimers

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to" As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for recouping computing resources that have been previously allocated for processing tasks at a plurality of worker nodes in a distributed computing cluster, the method comprising:

receiving, from a worker node, information indicative of actual computing resource utilization at the worker node, the worker node including a previously allocated first-tier resource to process a first task, wherein the first-tier resource is deterministically allocated; and allocating an opportunistic second-tier resource at the worker node to process a second task in response to determining that the actual computing resource utilization at the worker node is below a first threshold;

wherein the opportunistic second-tier resource includes underutilized computing resources previously allocated and guaranteed to the previously allocated first-tier resource, and wherein the opportunistic second-tier resource is subject to deallocation if the actual computing resource utilization at the worker node rises above a second threshold;

wherein the first and second thresholds are described based on the following equations:

$$T1 = \text{Talloc} \times Rn$$

$$T2 = \text{Tpreempt} \times Rn$$

wherein T1 is the first threshold, Talloc is a variable over-allocation parameter, T2 is the second threshold, Tpreempt is a variable preemption parameter, and Rn is a computing resource capacity at the worker node.

2. The method of claim 1, further comprising:
    de-allocating the opportunistic second-tier resource in response to determining that actual computing resource utilization at the worker node has risen above the second threshold.

3. The method of claim 1, wherein the opportunistic second-tier resource is de-allocated, by the worker node, in response to a determination, by the worker node, that the actual computing resource utilization at the worker node has risen above the second threshold.

4. The method of claim 1, wherein the opportunistic second-tier resource is allocated at the worker node to process the second task after determining that the second task allows processing by opportunistic second-tier resources.

5. The method of claim 1, wherein a request received at the worker node to process a particular task in the distributed computing cluster includes an indication to allow or disallow processing of the particular task using an opportunistic second-tier resource.

6. The method of claim 1, wherein the information received from the worker node includes periodic heartbeat signals, the method further comprising:

determining whether to de-allocate the previously allocated opportunistic second-tier resource at the worker node each time a periodic heartbeat signal is received.

7. The method of claim 1, wherein the information received from the worker node includes values for the first and/or second threshold.

8. The method of claim 1, further comprising:
setting the first and/or second threshold based on the information received from the worker node.

9. The method of claim 1, wherein the first threshold and/or second threshold dynamically adjust in response to changes in actual computing resource utilization at the worker node.

10. The method of claim 1, wherein the first threshold and/or second threshold are specific to the worker node and are different than thresholds at another worker node in the distributed computing cluster.

11. The method of claim 1, wherein the second threshold is higher than the first threshold.

12. The method of claim 1, further comprising:
allocating an opportunistic third-tier resource at the worker node to process a third task in response to determining that the actual computing resource utilization at the worker node is below a third threshold;
wherein the opportunistic third-tier resource includes underutilized computing resources previously allocated and guaranteed to the previously allocated first-tier resource and/or the opportunistic second-tier resource, and wherein the opportunistic third-tier resource is subject to de-allocation if the actual computing resource utilization at the worker node rises above a fourth threshold.

13. The method of claim 12, wherein the third threshold is the same as the first threshold, and wherein the fourth threshold is the same as the second threshold.

14. The method of claim 1, wherein the computing resources at the worker node include any one or more of processing, memory, data storage, I/O, or network resources.

15. A system for recouping computing resources that have been previously allocated for processing tasks at a plurality of worker nodes in a distributed computing cluster, the system comprising:
a processor; and
a memory having instructions stored thereon, which when executed by the processor, cause the system to:
receive, from a worker node, information indicative of actual computing resource utilization at the worker node, the worker node including a previously allocated first-tier resource to process a first task, wherein the first-tier resource is deterministically allocated;
and allocate an opportunistic second-tier resource at the worker node to process a second task in response to determining that the actual computing resource utilization at the worker node is below a first threshold;
wherein the opportunistic second-tier resource includes underutilized computing resources previously allocated and guaranteed to the previously allocated first-tier resource, and wherein the opportunistic second-tier resource is subject to de-allocation if the actual computing resource utilization at the particular worker node rises above a second threshold;

wherein the first and second thresholds are described based on the following equations:

$$T1 = Talloc \times Rn$$

$$T2 = Tpreempt \times Rn$$

wherein T1 is the first threshold, Talloc is a variable over-allocation parameter, T2 is the second threshold, Tpreempt is a variable preemption parameter, and Rn is a computing resource capacity at the worker node.

16. The system of claim 15, wherein the information received from the worker node includes periodic heart beat signals, and wherein the memory has further instructions stored thereon, which when executed by the processor, cause the system to further:
determine whether actual resource utilization has risen above the second threshold each time a periodic heart beat signal is received.

17. The system of claim 15, wherein the first threshold and/or second threshold dynamically adjust in response to changes in actual computing resource utilization at the worker node.

18. A method for recouping computing resources that have been previously allocated for processing tasks at a plurality of worker nodes in a distributed computing cluster, the method comprising:
receiving, from a worker node, information indicative of actual computing resource utilization at the worker node, the worker node including:
a first-tier resource to process a first task, wherein the first-tier resource was deterministically allocated; and
an opportunistic second-tier resource to process a second task, wherein the opportunistic second tier resource includes underutilized computing resources previously allocated and guaranteed to the first-tier resource, and wherein the opportunistic second-tier resource was allocated in response to the actual computing resource utilization at the worker node falling below a first threshold;
determining, based on the information, that actual computing resource utilization at the worker node has risen above a second threshold; and
deallocating the opportunistic second-tier resource in response to determining that the actual computing resource utilization at the worker node has risen above the second threshold;
wherein the first and second thresholds are described based on the following equations:

$$T1 = Talloc \times Rn$$

$$T2 = Tpreempt \times Rn$$

wherein T1 is the first threshold, Talloc is a variable over-allocation parameter, T2 is the second threshold, Tpreempt is a variable preemption parameter, and Rn is a computing resource capacity at the worker node.

19. The method of claim 18, wherein the information received from the worker node includes periodic heart beat signals, the method further comprising:
determining whether actual resource utilization has risen above the second threshold each time a periodic heart beat signal is received.

* * * * *